G. M. PETERS.
ADJUSTABLE METALLIC DASHES FOR VEHICLES.
No. 7,789. Reissued July 10, 1877.
Fig. 1.
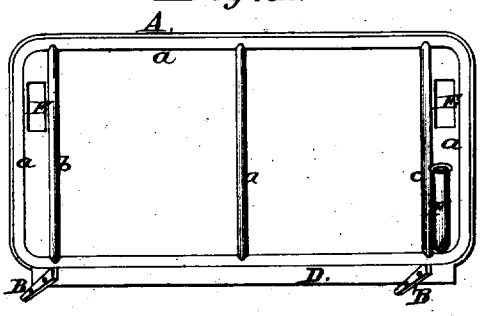
Fig. 2.
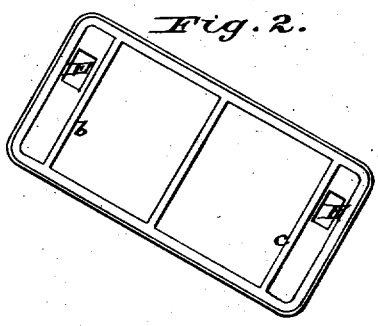
Fig. 3.
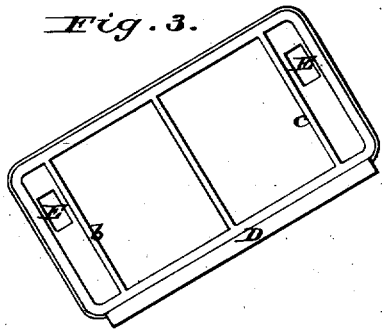
Fig. 4.
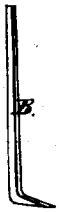
Fig. 5.
Fig. 6.
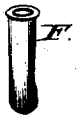
Attest:
H. D. Penne
Chas. A. Neale
Geo. M. Peters.
Inventor.
By. Wm. Hubbell Fisher,
Attorney.
N. PETERS, PHOTO-LITHOGRAPHER, WASHINGTON, D. C.

UNITED STATES PATENT OFFICE.

GEORGE M. PETERS, OF COLUMBUS, OHIO.

IMPROVEMENT IN ADJUSTABLE METALLIC DASHES FOR VEHICLES.

Specification forming part of Letters Patent No. 102,315, dated April 26, 1870; Reissue No. 4,408, dated May 30, 1871; Reissue No. 4,681, dated April 9, 1872; Reissue No. 7,789, dated July 10, 1877; application filed May 15, 1877.

*To all whom it may concern:*

Be it known that I, GEORGE M. PETERS, of Columbus, in the county of Franklin and State of Ohio, have invented new and useful Improvements in Dashes for Vehicles, of which the following is a specification:

The object of my invention is to supply the trade with dashes as an independent article of manufacture, the dashes being so devised that they may be adapted to carriages of various construction. In order to accomplish this it is necessary that such dashes be provided with independent or separable foot-pieces, which, not being permanently attached to the dash may, without disfiguring the latter, be worked by the smith into the proper shape to conform them (the foot-pieces) to the peculiar shape of the carriage-body to which the dash is to be attached.

My invention consists, first, in a movable dash made without feet, but so devised that it may be readily connected to feet first fitted to the carriage-body; secondly, in stiffening the sheet metal for dashes, by raising or stamping moldings on the same; thirdly, in providing a dash with a recess, groove, or socket for the reception of the shank of the foot; fourthly, in an independent dash-foot, adapted to be fitted to the carriage-body while separate from the dash.

In the annexed drawings I have illustrated one example of my invention. It is a sheet-metal dash. My invention of a footless dash is, however, not limited to a sheet-metal dash, but is applicable to leather and other dashes.

In so far as the special features of novelty of the sheet-metal dash shown are concerned, it may be made of one or more sheets.

Figure 1 is an elevation of a dash. Figs. 2 and 3 are vertical longitudinal sections of the front and rear of a dash formed of two sheets of metal. Figs. 4, 5, and 6 are elevations of detached portions.

The same letters are employed in all the figures.

A represents the sheet or sheets from which the dash is constructed. When two are used a method of connecting them (which is convenient and also imparts a handsome finish to the dash) is to make the edges of one sheet slightly larger and fold the same over the edges of the other. These sheets are formed by pressing them in a mold with moldings, indicated by the letters *a*, *b*, and *c*, which not only serve as ornaments, but also stiffen the sheets so as to render them self-supporting without the use of the ordinary frames.

To furnish further strength to the dash, an iron frame may be placed in the grooves *a*, *b*, and *c*; but for the sake of lightness I prefer only to insert an iron bar, as shown in Fig. 5, in the rib or groove across the top.

The two parts or sheets, as shown in Figs. 2 and 3, are joined together by turning the edge or edges over a wire, fastening the same with solder, making a good finish, and also giving additional strength to the dash, first, however, placing between the sheets a layer of canvas or cement to prevent rattling. B B, Figs. 1 and 4, indicate the dash-feet, forged, in the case as illustrated, to fit into the recesses formed by the vertical moldings *b* and *c*, and which may be fastened, if desired, to the dash by small screws or bolts. The lower end of the feet may be forged into the form required in each special case while separated from the dash. E E indicate holes cut in the dash in the ordinary form, to serve as handles, and F is the ordinary whip-socket, attached in the usual manner.

In the event of the breaking of the dash-foot, which is the part generally broken, (when the dash is subject to unusual strain,) it may be readily removed and repaired, or a new one substituted therefor, whereas, in a dash where the foot is not removable, or is a part of the dash-frame, the dash itself must be injured by being subjected to the heat necessary to repair the broken foot. Another advantage is that the foot can be made and attached to the body, and painted up with the same, irrespective of the time when the dash is itself attached.

I do not intend to limit myself to the special method hereinbefore described of connecting the dash to the feet, since many other methods which will readily suggest themselves to a mechanic skilled in the art may be adopted in lieu of the particular method shown.

What I claim as my invention, and desire to secure by Letters Patent, is—

1. As a new article of manufacture, a footless carriage-dash, including a provision which adapts it to be readily connected to and detached from feet used to secure it to a carriage, substantially as and for the purpose specified.

2. A metallic dash for carriages, constructed with moldings raised upon its surface, substantially as and for the purpose specified.

3. A dash provided with a recess, groove, or socket, for the reception of the shank of a dash-foot, substantially as and for the purposes specified.

4. An independent dash-foot, adapted to be fitted to the carriage-body while separate from the dash, substantially as and for the purpose specified.

5. In combination, a dash and an independent separable dash-foot, substantially as and for the purposes set forth.

GEORGE M. PETERS.

Witnesses:

C. D. FIRESTONE,

JASON W. FIRESTONE.